United States Patent [19]
Frastaci et al.

[11] Patent Number: 5,575,582
[45] Date of Patent: Nov. 19, 1996

[54] FASTENING DEVICE FOR SECURING ELECTRODE JOINTS

[75] Inventors: Michael Frastaci, Parma; Richard T. Lewis, Parma Heights; David G. Proctor, Berea; David M. Riffle, Medina, all of Ohio

[73] Assignee: UCAR Carbon Technology Corporation, Danbury, Conn.

[21] Appl. No.: 374,937

[22] Filed: Jan. 18, 1995

[51] Int. Cl.⁶ .................................................. F16B 13/00
[52] U.S. Cl. ............................ 403/320; 403/32; 403/296; 403/DIG. 5; 373/91
[58] Field of Search ............................ 403/296, 292, 403/319, 320, 315, 316, 32, 24, 13, DIG. 5; 373/92, 91, 94, 100, 51, 52; 313/331, 332, 352

[56] References Cited

U.S. PATENT DOCUMENTS

| | | |
|---|---|---|
| 1,572,534 | 2/1926 | Hinckley. |
| 3,173,714 | 3/1965 | Whitwell .................................. 403/296 |
| 3,540,764 | 11/1970 | Paus et al. ...................... 403/DIG. 5 X |
| 3,705,947 | 12/1972 | Persson ....................................... 373/91 |
| 3,727,095 | 4/1973 | Hesselmann .................. 403/DIG. 5 X |
| 3,771,889 | 11/1973 | Lhitwell et al. ......................... 403/296 |
| 4,725,161 | 2/1988 | Dagata ........................... 403/DIG. 5 X |
| 4,813,805 | 3/1989 | Dagata ....................................... 403/32 |
| 5,336,015 | 8/1994 | Stewart et al. ................. 403/DIG. 5 X |

FOREIGN PATENT DOCUMENTS 1080709 4/1960 Germany ................................. 373/92

Primary Examiner—Kenneth J. Dorner
Assistant Examiner—Harry C. Kim
Attorney, Agent, or Firm—Frederick J. McCarthy

[57] ABSTRACT

Electrode joint for threadably joining two abutting carbon upper and lower electrode sections is provided with a locking pin releasably held in an upper electrode section which when released engages a groove in a lower electrode section.

4 Claims, 6 Drawing Sheets

FASTENING DEVICE FOR SECURING ELECTRODE JOINTS

FIELD OF THE INVENTION

This invention relates to a fastening arrangement for securing an electrode joint formed by a threaded nipple which connects together contiguous, abutting upper and lower sections of carbon, including graphite, electrodes to provide a stable longitudinally extending electrode column for use in an electric arc furnace. More particularly, the present invention is directed to an electrode joint fastening device which includes a tapered locking pin formed of carbon, including graphite, which is positioned in an upper electrode section and is releasable to partially descend into a recess in the lower electrode section and thereby lock together the upper and lower electrode sections to prevent the unthreading thereof.

BACKGROUND OF THE INVENTION

With state-of-the-art conventional carbon electrodes a pair of longitudinally extending vertically positioned electrode sections are coupled by means of a threaded graphite nipple which is threaded into correspondingly threaded opposed sockets of the electrode sections by relative rotation of the electrode sections, with the result that the respective opposing butt faces of the vertical electrode sections are brought into abutting contact. As an electrode section is consumed in the course of furnace operation, a new electrode section is tandemly coupled in the same manner so that furnace operation can proceed continuously. That is, as the lower end of the column is consumed in the furnace, the entire column is lowered to maintain the operation and electrode sections are joined to the top of the column to replenish the consumed columns. However, there is occasional loosening of the threadably engaged joint by rotation of an electrode section in a direction opposite to its threading direction which can lead to increased electrical resistance and also to mechanical failure, i.e. breakage of a threaded nipple joint which requires the interruption of electric furnace operation.

An early prior art effort to address this problem with respect to horizontally positioned carbon electrode sections is disclosed in U.S. Pat. No. 1,572,534—Hinckley which describes a variety of blade shaped metal implements which are forced into the electrode joint and act as a key to prevent loosening of the joint. Due to the temperatures experienced in modern electric arc furnaces, a metal key would melt and be ineffective as the electrode joint approached the high temperature electrode arc from above. Also, U.S. Pat. No. 4,813,805—Dagata discloses the use of a peg extending between upper and lower electrode sections which is held in place by coked pitch.

SUMMARY OF THE INVENTION

It has been found, as part of the present invention, that threaded nipple joint failures commonly occur when the coupled carbon, including graphite, electrode sections and/ or nipple loosen and are not firmly in abutting contact. Observation of such electrodes during furnace operation and examination of a number of failed threaded electrodes in nipple joints has shown that the coupled electrode sections were significantly separated due to loosening, i.e. rotation of the threaded joint and thus subject to relative movement during furnace operation, which condition often led to the joint failures.

It is therefore an object of the present invention to provide a means for ensuring the maintenance of a stable threaded joint for carbon, including graphite, electrode sections in order to avoid electrode joint failure.

This and other objects are accomplished by providing a downwardly tapered carbon, including graphite, locking pin in a passage in the upper electrode section which overlies a slot shaped passage in the lower electrode section. The locking pin is releasably held in the passage in the upper electrode section and, upon release, slides downwardly in the passage and part of the locking pin extends into the slot in lower electrode section wherein it wedges to restrain unthreading of the electrode sections.

DETAILED DESCRIPTION OF THE DRAWINGS

Figure 1:
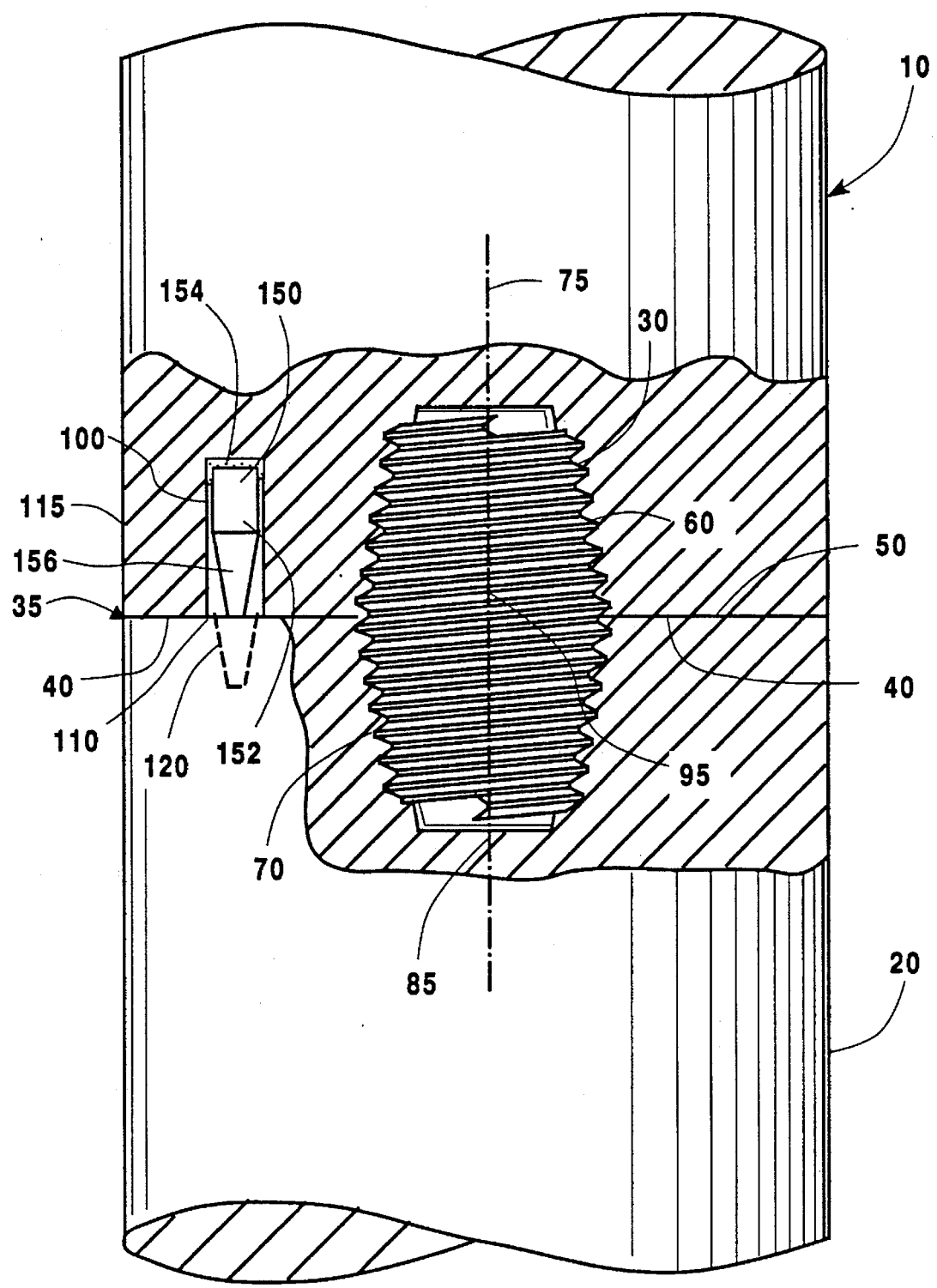
FIG. 1 is an elevation view, partly in section, of joined electrode sections which incorporate the present invention.

FIG. 1 shows a conventional carbon or graphite electrode joint arrangement for coupling the carbon or graphite upper electrode section 10 and lower electrode section 20. The opposed electrode sections 10, 20 are coaxially aligned and threadably engaged with threaded nipple 30 to be in abutting relationship at contact interface 35 between transverse annular butt faces 40, 50 which have respective threaded sockets 60, 70 with their central longitudinal axes 75, 85 coincident as shown in FIG. 1 and also coincident with the central longitudinal axis 95 of double tapered threaded nipple 30 as shown. In the course of furnace operation, the joint comprising the threaded nipple and opposed electrode sections can be loosened and stresses are created which can result in breakage of the electrode sections. This condition has been found to significantly contribute to the stresses which result in electrode joint mechanical failure, i.e. breakage.

Figure 2A:
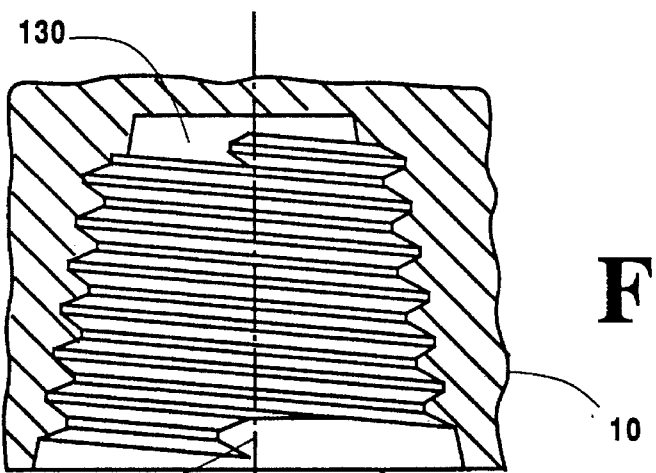
FIGS. 2, 2A, 2B show an exploded, vertical cross-sectional view of the electrode joint of FIG. 1.
Figure 2:
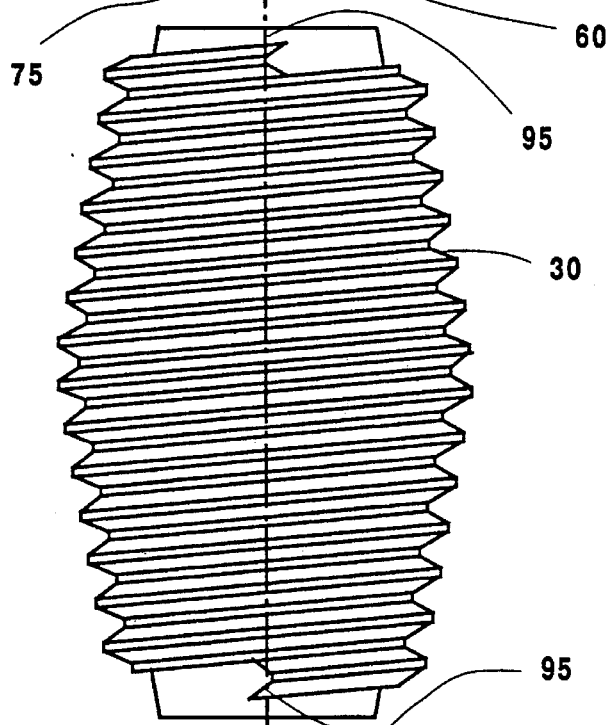
Figure 2B:
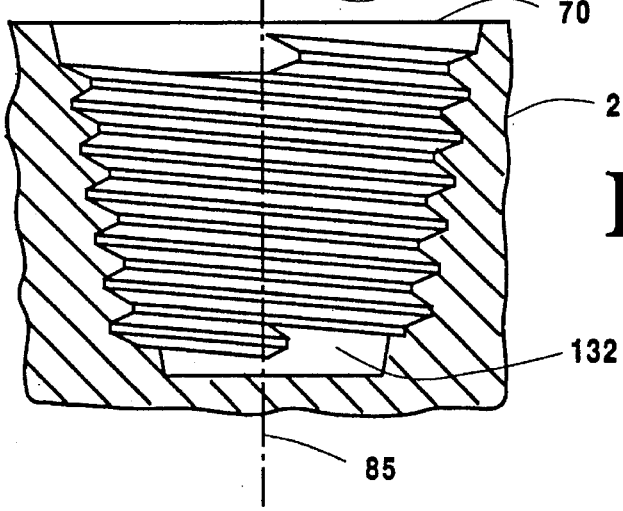
Figure 5:
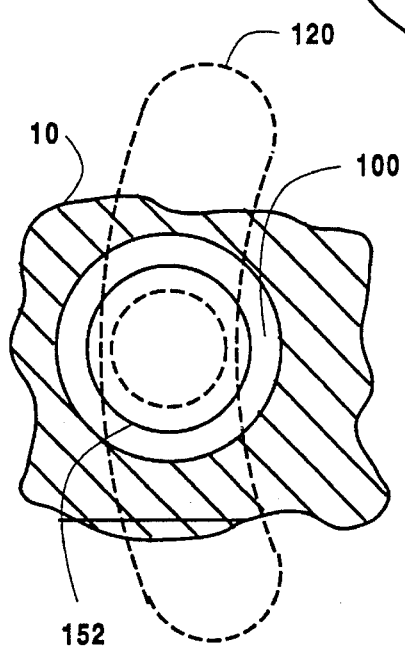
FIG. 5 is a bottom view along 5—5 of FIG. 4.

With reference to FIGS. 1, 3A, 3B, 3C this problem is avoided by providing a longitudinally extending passage 100 in the upper electrode section 10 which extends upwardly from an opening 110 in annular butt face 50 of upper electrode section 10. Passage 100 is suitably positioned about ¼ to ¾ of the radial distance from longitudinal axis 75 to the outer periphery 115 of upper electrode section 10, indicated at 76 in FIG. 3B. A slot 120 is provided in the annular butt face 40 of lower electrode section 20 underlying the passage 100 located in upper electrode section 10 as above described. With the thread design of nipple 30 and sockets 60, 70 in accordance with NEMA STANDARDS PUBLICATION CG1-1993, as illustrated in FIGS. 2, 2A, 2B, an internationally observed standard, the positioning of passage 100 to overlie slot 120 is routinely accomplished by keying the thread terminations 130, 132 of sockets 60, 70, shown in FIGS. 3A, 3B to physical locations on butt faces 40, 50 shown which are shown at arc segment 140 and at passage 100, 142 in FIGS. 3A, 3B, respectively. Upon threading nipple 30 into upper socket 60, and then into lower socket 70, the locations 140, 142 come into alignment with the passage 100 overlying a portion of slot 120 as shown in FIG. 5.

Figure 3A:
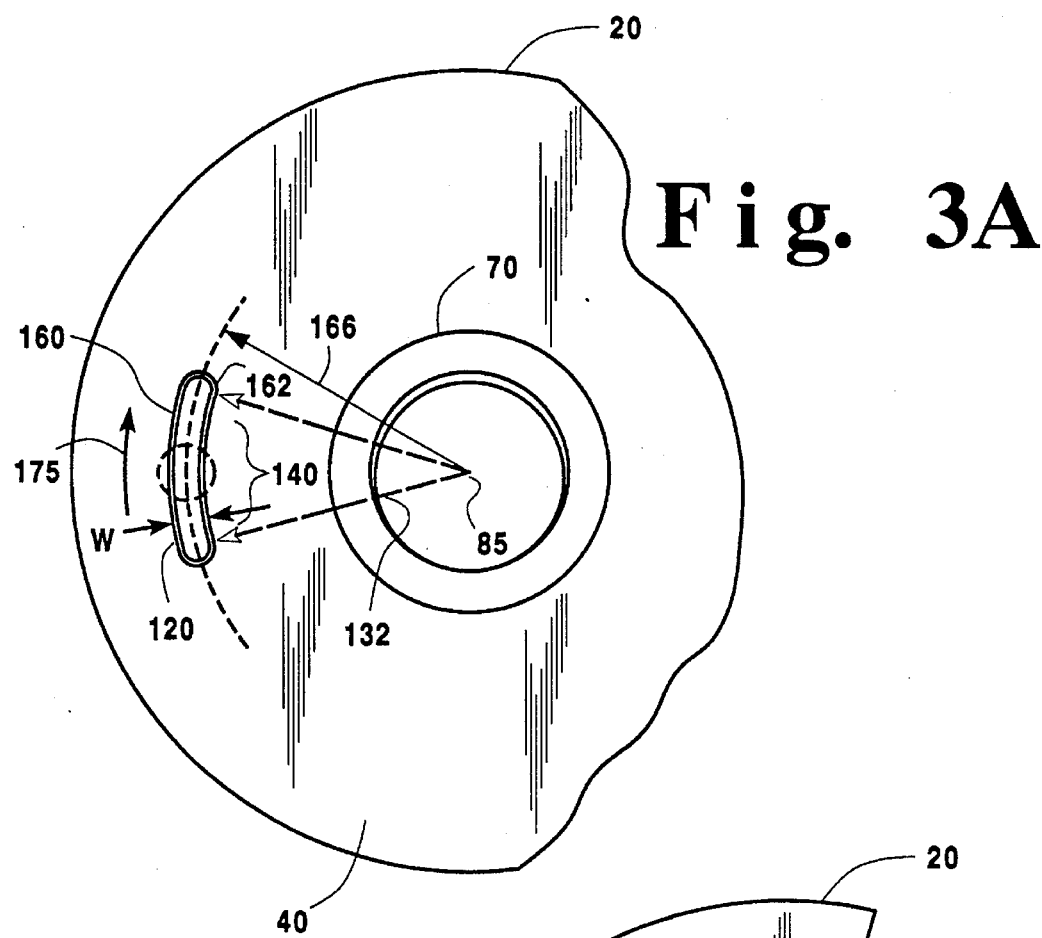
FIGS. 3A, 3B, 3C are plan views of the annular butt faces of the electrode joint of FIG. 1.
Figure 3C:
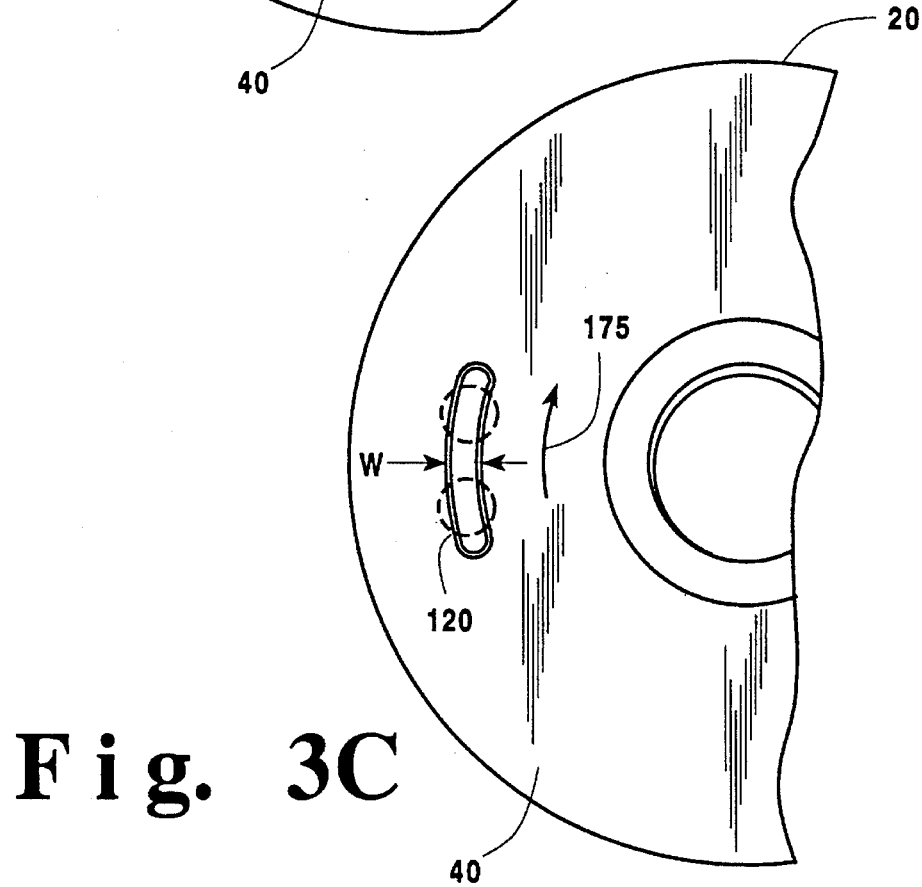
Figure 3B:
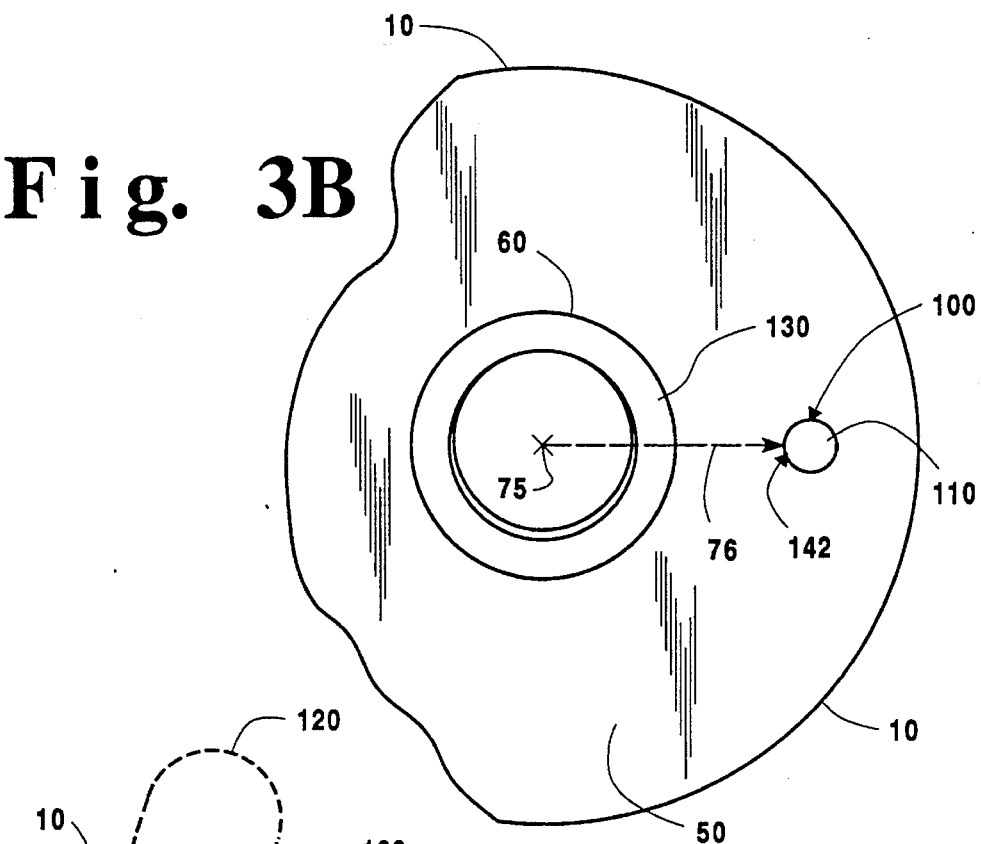
Figure 6B:
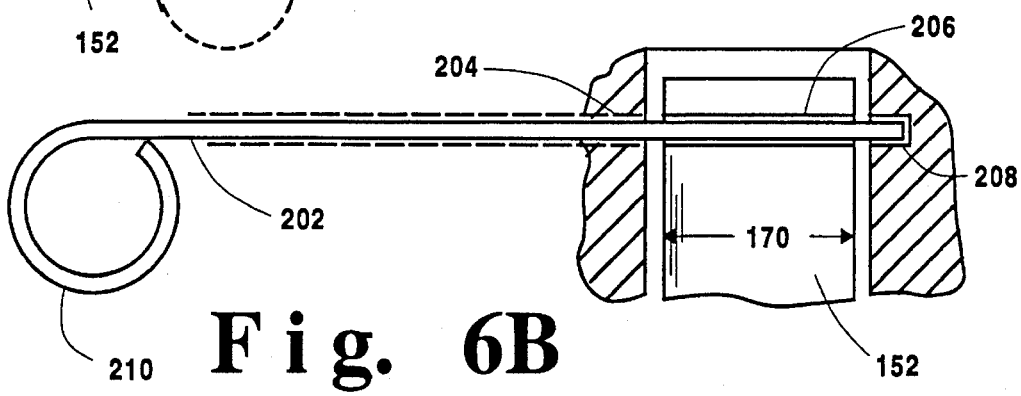
FIGS. 6, 6A, 6B show further details of the interlocking arrangement of the present invention.
Figure 4:
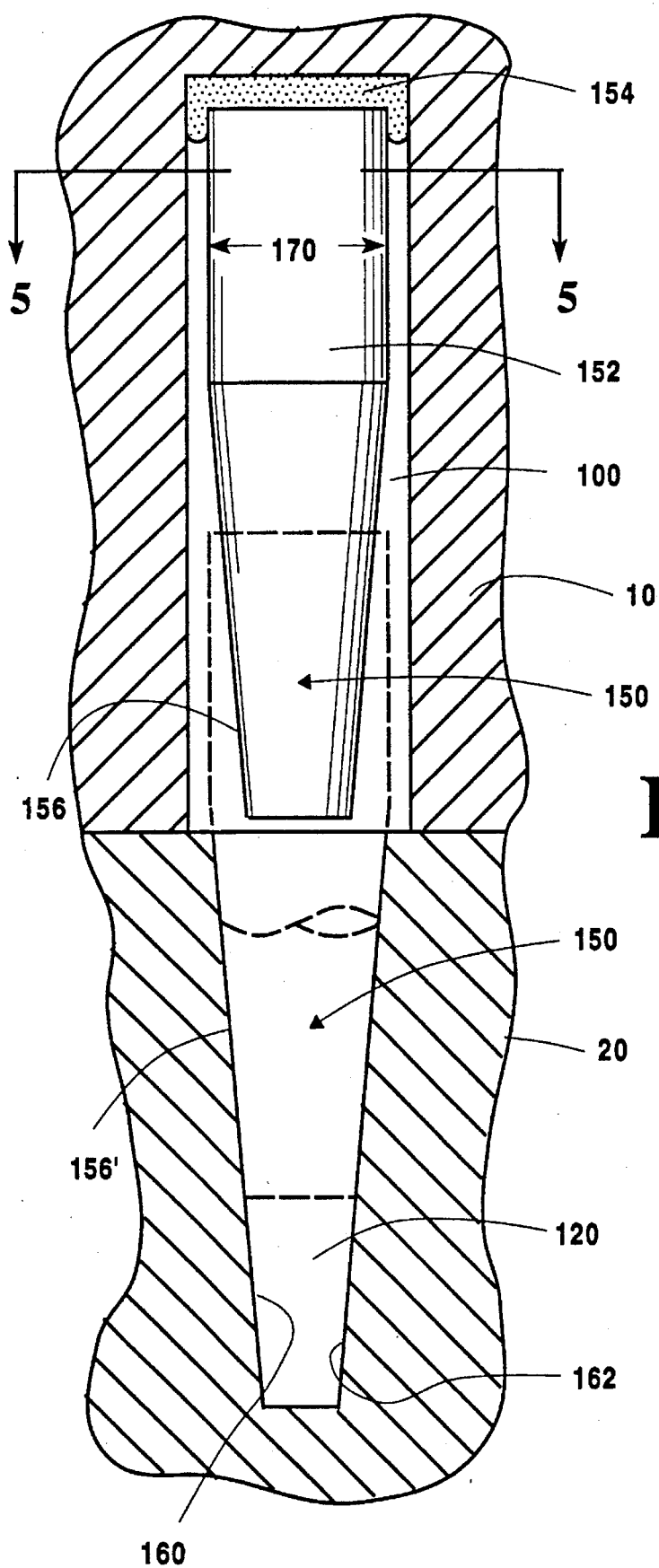
FIG. 4 is an elevation view, partly in section, showing details of the interlocking arrangement of the present invention.
Figure 6:
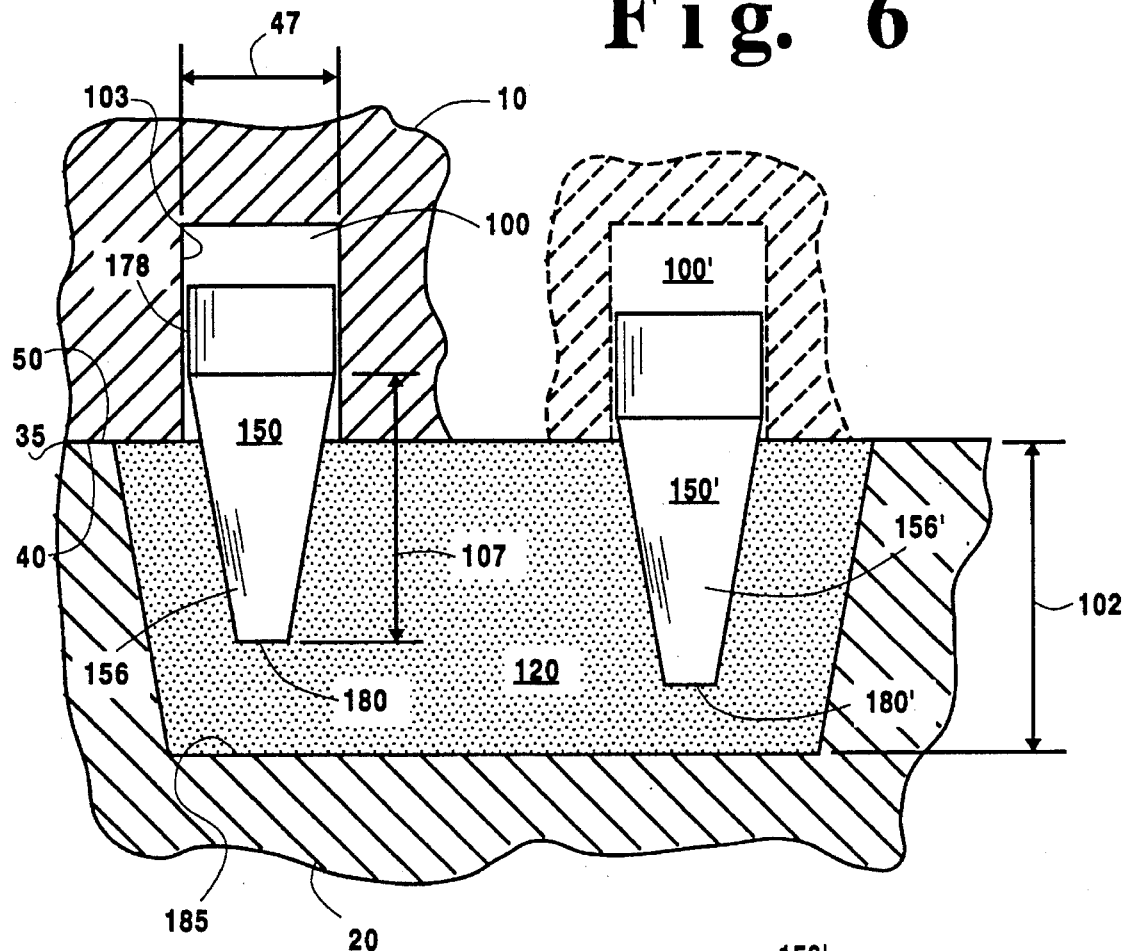
Figure 6A:
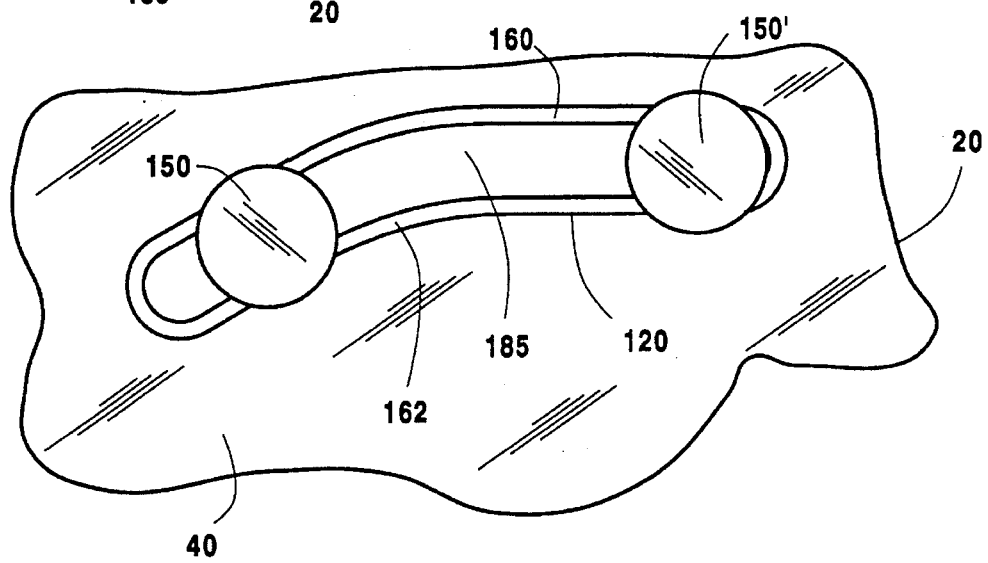

With further reference to FIG. 1 in conjunction with FIGS. 4, 5, 6 and 6A, a carbon, including graphite, elongate locking pin 150 is positioned in passage 100 of upper electrode section 10. The upper straight-sided portion 152 of locking pin 150 fits closely within passage 100 and locking pin 150 is releasably held within passage 100, suitably by a temperature responsive medium, e.g. a wax or paste 154 which will release locking pin 150 when the joined electrode sections 10, 20 are conducting electric current in electric arc furnace operation. Also, mechanical means for releasably holding the locking pin can be used as shown in FIG. 6B. Wherein a metal pin 202 passes through hole 204 in electrode 10, through hole 206 in locking pin 150 and into a friction engagement with passage 208 in the upper electrode section 10. Pulling on handle 210 of metal pin 202 will remove metal pin from passage 108 and hole 208 and locking pin 150 is released. Upon release of locking pin 150, the straight-sided upper portion 152 of locking pin 150 slides downwardly and is guided through close fitting passage 100. The lower portion 156 of locking pin 150 is downwardly tapered and locking pin 150 comes to rest in slot 120 when its lower tapered portion 156 nests and wedges in the downwardly tapering side walls 160, 162 of slot 120 so that part of locking pin 150 is in slot 120, and part is in passage 100. Slot 120, as shown in FIG. 3A, is curved and extends radially equidistantly from the central longitudinal axis 85 of lower electrode section 20 as shown at 166, and is downwardly tapered at its sides 160, 162 to correspond to the taper of the lower portion 156 of locking pin 150. The width, w, of slot 120 is everywhere less than the width 170 of the straight-sided upper portion 152 of locking pin 150 and the width, w, of slot 120 decreases in the direction opposite to the threading rotation direction, indicated at 175, of lower electrode section 20. Accordingly, the release of locking pin 150 results in the wedging of tapered portion 156 of locking pin 150 at the tapered side walls 160, 162 of slot 120, and, in the event of a slight unthreading of the electrode sections 10, 20, a bearing contact of the upper portion 152 against closely adjacent side wall 103 of passage 100 as shown at 178 in FIG. 6. For a situation where the passage 100' overlies a wider portion of slot 120, the locking pin 150' with the tapered portion 156' and the bottom 180' wedges at a lower position as shown in FIG. 6, the slot 120 having a curved length sufficient to avoid the necessity of highly precise location of slot 120. The length of slot 120, indicated at arc segment 140 in FIG. 3A, is suitably 3 to 10 times the diameter 97 of passage 100; the depth 102 of the slot 120 is suitably 10 to 20% more than the length 107 of tapered portion 156 of locking pin 150 so that the bottom 180 of locking pin 150 is above the bottom 185 of slot 120.

What is claimed is:

1. In a carbon electrode joint comprising two vertically positioned longitudinally coaxially aligned abutting upper and lower electrode sections, each said electrode section having an annular butt face transverse to its central longitudinal axis and a threaded socket in its annular butt face, and a correspondingly threaded nipple longitudinally coaxially aligned with and joining said electrode sections in an abutting relationship by threading rotation of the respective electrode sections to define an annular contact interface, the improvement which comprises a passage in the upper electrode section extending from an opening in its annular butt face substantially parallel to and spaced from the central longitudinal axis of the upper electrode section; a tapered carbon, including graphite, locking pin positioned in said passage in said upper electrode section having an upper straight-sided portion which has a width such that the locking pin is slidably engaged with said passage and having a lower downwardly tapered portion, means for releasably holding said locking pin in said passage in said upper electrode section; a slot shaped passage in the lower electrode section extending from an opening in its annular butt face wherein said slot shaped passage has a width which is less than the width of the straight-sided portion of said locking pin, at least a portion of said opening of the lower electrode section being directly below the opening of said passage in the annular butt face of the upper electrode section, said slot shaped passage extending radially equidistantly from the central longitudinal axis of the lower electrode section, said opening of said slot shaped passage in the annular butt face of the lower electrode section having the width which decreases in the direction opposite to the threading rotation direction of the lower electrode section and a depth which is downwardly tapered to correspond to the downwardly tapered portion of said locking pin whereby upon release of the locking pin, the lower downwardly tapered portion thereof will enter said slot shaped passage and engage with the downwardly tapered portion of said slot shaped passage.

2. Device in accordance with claim 1 wherein said locking pin is releasably held in said passage of the upper electrode section by a temperature responsive medium which will release the locking pin when the upper electrode section and the lower electrode section are conducting electric current in electric arc furnace operation.

3. Device in accordance with claim 1 wherein said locking pin is releasably held in said passage of the upper electrode section by a removable pin element which passes through the upper electrode section and the locking pin.

4. Device in accordance with claim 1 wherein the said slot shaped passage has said depth which is 10% to 20% greater than the downwardly tapered portion of the locking pin.

\* \* \* \* \*